(12) United States Patent
Bittar et al.

(10) Patent No.: US 9,909,414 B2
(45) Date of Patent: Mar. 6, 2018

(54) FRACTURE CHARACTERIZATION USING DIRECTIONAL ELECTROMAGNETIC RESISTIVITY MEASUREMENTS

(71) Applicant: HALLIBURTON ENERGY SERVICES, INC., Houston, TX (US)

(72) Inventors: Michael S. Bittar, Houston, TX (US); Clive D. Menezes, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/709,314

(22) Filed: May 11, 2015

(65) Prior Publication Data

US 2015/0240631 A1    Aug. 27, 2015

Related U.S. Application Data

(63) Continuation of application No. 13/131,872, filed as application No. PCT/US2009/054470 on Aug. 20, 2009.

(51) Int. Cl.
*E21B 49/00* (2006.01)
*G01V 1/28* (2006.01)
(Continued)

(52) U.S. Cl.
CPC ............. *E21B 49/00* (2013.01); *E21B 43/26* (2013.01); *E21B 47/122* (2013.01); *G01V 3/18* (2013.01); *G01V 3/20* (2013.01)

(58) Field of Classification Search
CPC .......... G01R 33/20; G01V 3/12; G01V 3/083; G01V 3/28; G01V 3/20; G01V 11/00;
(Continued)

(56) References Cited

U.S. PATENT DOCUMENTS

| 4,104,596 A | 8/1978 | Smither |
| 4,258,321 A | 3/1981 | Neale |

(Continued)

FOREIGN PATENT DOCUMENTS

| GB | 1111629 | 5/1968 |
| GB | 2352259 | 1/2001 |
| GB | 2475456 | 11/2012 |
| WO | 2007/149146 | 12/2007 |
| WO | 2008/076130 | 6/2008 |
| WO | 2010/060040 | 5/2010 |

OTHER PUBLICATIONS

AU First Exam Report, dated Feb. 3, 2012, Appl No. 2009318042, "A High Frequency Dielectric Measurement Tool", filed Aug. 11, 2009, 4 pgs.

(Continued)

*Primary Examiner* — Alesa Allgood
(74) *Attorney, Agent, or Firm* — Alan Bryson; Parker Justiss, P.C.

(57) ABSTRACT

A disclosed fracture characterization method includes: collecting three-dimensional resistivity measurements of a volume surrounding an open borehole; analyzing the measurements to determine parameters describing fractures in the volume; and providing a report to a user based at least in part on said parameters. A fluid with a contrasting resistivity is employed to make the fractures detectable by a directional electromagnetic logging tool in the borehole. Illustrative parameters include fracture direction, height, extent, length, and thickness. The resistivity measurements can be augmented using a borehole wall image logging tool. Also disclosed are fracturing methods that include: positioning a directional electromagnetic logging tool proximate to a formation; fracturing the formation; monitoring fracture progression with said tool; and halting the fracturing when measurements by said tool indicate that a predetermined set of criteria have been satisfied.

18 Claims, 4 Drawing Sheets

(51) Int. Cl.
  *E21B 43/26* (2006.01)
  *G01V 3/20* (2006.01)
  *E21B 47/12* (2012.01)
  *G01V 3/18* (2006.01)

(58) Field of Classification Search
  CPC ... G01V 3/38; G01V 3/30; G01V 3/08; G01V 3/18; G01V 11/002; G01V 1/40; G01V 3/088; G01V 3/26; G01V 99/005; E21B 43/26; E21B 49/00; E21B 47/00
  USPC .................................................. 324/323–369
  See application file for complete search history.

(56) References Cited

U.S. PATENT DOCUMENTS

| | | | |
|---|---|---|---|
| 4,365,322 | A | 12/1982 | Widrow |
| 4,430,653 | A | 2/1984 | Coon et al. |
| 4,689,569 | A | 8/1987 | Duff |
| 4,814,768 | A | 3/1989 | Chang |
| 4,825,421 | A | 4/1989 | Jeter |
| 4,829,488 | A | 5/1989 | Siegfried, II |
| 4,909,336 | A | 3/1990 | Brown et al. |
| 4,924,187 | A * | 5/1990 | Sprunt ............... G01N 33/241 324/376 |
| 5,113,192 | A | 5/1992 | Thomas |
| 5,133,418 | A | 7/1992 | Gibson et al. |
| 5,248,975 | A | 9/1993 | Schutz |
| 5,318,123 | A * | 6/1994 | Venditto ............... E21B 43/26 166/250.1 |
| 5,357,253 | A | 10/1994 | Van Etten et al. |
| 5,377,104 | A | 12/1994 | Sorrells et al. |
| 5,389,881 | A | 2/1995 | Bittar et al. |
| 5,400,030 | A | 3/1995 | Duren et al. |
| 5,420,589 | A | 5/1995 | Wells et al. |
| 5,503,225 | A | 4/1996 | Withers |
| 5,552,786 | A | 9/1996 | Xia et al. |
| 5,720,354 | A | 2/1998 | Stump et al. |
| 5,720,355 | A | 2/1998 | Lamine et al. |
| 5,747,750 | A | 5/1998 | Bailey et al. |
| 5,757,191 | A | 5/1998 | Gianzero |
| 5,765,642 | A | 6/1998 | Surjaatmadja |
| 5,900,833 | A | 5/1999 | Sunlin et al. |
| 5,917,160 | A | 6/1999 | Bailey |
| 6,078,867 | A | 6/2000 | Plumb et al. |
| 6,100,839 | A | 8/2000 | Heger et al. |
| 6,163,155 | A | 12/2000 | Bittar |
| 6,181,138 | B1 | 1/2001 | Hagiwara et al. |
| 6,191,586 | B1 | 2/2001 | Bittar |
| 6,191,588 | B1 | 2/2001 | Chen |
| 6,216,783 | B1 | 4/2001 | Hocking et al. |
| 6,218,842 | B1 | 4/2001 | Bittar |
| 6,353,321 | B1 | 3/2002 | Bittar |
| 6,359,438 | B1 | 3/2002 | Bittar |
| 6,389,438 | B1 | 5/2002 | Zhou |
| 6,476,609 | B1 | 11/2002 | Bittar |
| 6,496,137 | B1 | 12/2002 | Johansson |
| 6,538,447 | B2 | 3/2003 | Bittar |
| 6,633,252 | B2 | 10/2003 | Stolarczyk et al. |
| 6,651,739 | B2 | 11/2003 | Arndt et al. |
| 6,755,263 | B2 | 6/2004 | Alft et al. |
| 6,765,385 | B2 | 7/2004 | Sinclair et al. |
| 6,771,206 | B2 | 8/2004 | Berthelier et al. |
| 6,778,127 | B2 | 8/2004 | Stolarczyik et al. |
| 6,810,331 | B2 | 10/2004 | Bittar et al. |
| 6,856,132 | B2 | 2/2005 | Appel |
| 6,885,943 | B2 | 4/2005 | Bittar et al. |
| 6,911,824 | B2 | 6/2005 | Bittar |
| 6,925,031 | B2 * | 8/2005 | Kriegshauser ......... G01V 11/00 324/333 |
| 6,940,446 | B2 | 9/2005 | Cist |
| 6,944,546 | B2 | 9/2005 | Xiao et al. |
| 6,958,610 | B2 | 10/2005 | Gianzero |
| 6,961,663 | B2 | 11/2005 | Sinclair et al. |
| 7,019,528 | B2 | 3/2006 | Bittar |
| 7,038,455 | B2 | 5/2006 | Beste et al. |
| 7,046,009 | B2 | 5/2006 | Itskovich |
| 7,046,010 | B2 | 5/2006 | Hu et al. |
| 7,062,072 | B2 | 6/2006 | Anxionnaz et al. |
| 7,098,664 | B2 | 8/2006 | Bittar et al. |
| 7,098,858 | B2 | 8/2006 | Bittar et al. |
| 7,138,803 | B2 | 11/2006 | Bittar |
| 7,143,844 | B2 | 12/2006 | Alft et al. |
| 7,227,363 | B2 | 6/2007 | Gianzero et al. |
| 7,265,552 | B2 | 9/2007 | Bittar |
| 7,296,462 | B2 | 11/2007 | Gregory et al. |
| 7,313,479 | B2 | 12/2007 | Frenkel |
| 7,336,222 | B2 | 2/2008 | Praskovsky et al. |
| 7,345,487 | B2 | 3/2008 | Bittar et al. |
| 7,350,568 | B2 | 4/2008 | Mandal et al. |
| 7,425,830 | B2 | 9/2008 | Banning et al. |
| 7,425,831 | B2 | 9/2008 | Banning et al. |
| 7,427,863 | B2 | 9/2008 | Bittar |
| 7,503,404 | B2 | 3/2009 | McDaniel et al. |
| 7,557,579 | B2 | 7/2009 | Bittar |
| 7,557,580 | B2 | 7/2009 | Bittar |
| 7,659,722 | B2 | 2/2010 | Bittar |
| 7,746,078 | B2 | 6/2010 | Bittar et al. |
| 7,775,276 | B2 | 8/2010 | Pelletier et al. |
| 7,839,148 | B2 | 11/2010 | Vehra et al. |
| 7,839,346 | B2 | 11/2010 | Bittar et al. |
| 7,948,238 | B2 | 5/2011 | Bittar |
| 7,982,464 | B2 | 7/2011 | Bittar et al. |
| 8,030,937 | B2 | 10/2011 | Hu et al. |
| 8,085,049 | B2 | 12/2011 | Bittar et al. |
| 8,085,050 | B2 | 12/2011 | Bittar et al. |
| 8,174,265 | B2 | 5/2012 | Bittar et al. |
| 8,222,902 | B2 | 7/2012 | Bittar et al. |
| 8,264,228 | B2 | 9/2012 | Bittar et al. |
| 8,274,289 | B2 | 9/2012 | Bittar et al. |
| 8,347,985 | B2 | 7/2013 | Bittar et al. |
| 8,866,483 | B2 | 10/2014 | Hu et al. |
| 8,890,531 | B2 | 11/2014 | Beste et al. |
| 9,411,068 | B2 | 8/2016 | Bittar et al. |
| 2003/0080743 | A1 | 5/2003 | Das et al. |
| 2003/0137301 | A1 | 7/2003 | Thompson et al. |
| 2004/0059514 | A1 | 3/2004 | Bittar et al. |
| 2004/0123655 | A1 | 7/2004 | MacPherson |
| 2005/0075789 | A1 | 4/2005 | Xiao et al. |
| 2005/0231436 | A1 | 10/2005 | McLean et al. |
| 2006/0173624 | A1 * | 8/2006 | Frenkel ............... G01V 3/265 702/7 |
| 2007/0079989 | A1 | 4/2007 | Bankston et al. |
| 2007/0235225 | A1 | 10/2007 | Bittar |
| 2007/0256830 | A1 * | 11/2007 | Entov ............... E21B 43/26 166/250.1 |
| 2008/0258733 | A1 | 10/2008 | Bittar |
| 2008/0290873 | A1 * | 11/2008 | Homan ............... G01V 3/30 324/337 |
| 2009/0138202 | A1 | 5/2009 | Tang et al. |
| 2009/0278543 | A1 | 11/2009 | Beste et al. |
| 2009/0310441 | A1 | 12/2009 | Johnson et al. |
| 2010/0117655 | A1 | 5/2010 | Bittar |
| 2010/0127708 | A1 | 5/2010 | Bittar |
| 2010/0262370 | A1 | 10/2010 | Bittar et al. |
| 2010/0284250 | A1 | 11/2010 | Cornish et al. |
| 2011/0006773 | A1 | 1/2011 | Bittar |
| 2011/0175899 | A1 | 7/2011 | Bittar et al. |
| 2011/0251794 | A1 | 10/2011 | Bittar et al. |
| 2015/0134254 | A1 * | 5/2015 | Li ............... G01V 3/24 702/7 |

OTHER PUBLICATIONS

AU Patent Examination Report No. 3, dated Apr. 20, 2015, Appl No. 2011366229, "Multicomponent Borehole Radar Systems and Methods," Filed Apr. 18, 2011, 3 pgs.

AU Second Exam Report, dated Mar. 1, 2013, Appl No. 2009318042, "A High Frequency Dielectric Measurement Tool", filed Aug. 11, 2009, 4 pgs.

AU Third Examination Report, dated Jul. 3, 2013, Appl No. 2009318042, "A High Frequency Dielectric Measurement Tool", filed Aug. 11, 2009, 3 pgs.

(56) References Cited

OTHER PUBLICATIONS

PCT International Preliminary Report on Patentability, dated Jun. 10, 2013, Appl No. PCT/US2011/032865, "Multicomponent Borehole Radar Systems and Methods", filed Apr. 18, 2011, 17 pgs.
PCT International Search Report and Written Opinion, dated Oct. 8, 2009, Appl No. PCT/US09/053354, "A High Frequency Dielectric Measurement Tool", filed Aug. 11, 2009, 11 pgs.
PCT International Preliminary Report on Patentability, dated Jun. 3, 2011, Appl No. PCT/US2009/053354, "A High Frequency Dielectric Measurement Tool", filed Aug. 11, 2009, 8 pgs.
PCT International Preliminary Report on Patentability, dated Jun. 3, 2011, Appl No. PCT/US2009/065537, "A 3D Borehole Imager", filed Nov. 23, 2009, 6 pgs.
PCT International Preliminary Report on Patentability, dated Mar. 1, 2012, Appl No. PCT/US2009/054470, "Fracture Characterization Using Directional Electromagnetic Resistivity Measurements", filed Aug. 20, 2009, 9 pgs.
PCT International Seach Report and Written Opinion, dated Oct. 20, 2009, Appl No. PCT/US2009/054470, "Fracture Characterization Using Directional Electromagnetic Resistivity Measurements", filed Aug. 20, 2009, 13 pgs.
PCT International Search Report and Written Opinion, dated Jan. 19, 2010, Appl No. PCT/US2009/065537, "A 3D Borehole Imager", filed Nov. 23, 2009, 7 pgs.
PCT International Search Report and Written Opinion, dated Jul. 26, 2011, Appl No. PCT/US2011/032865, "Multicomponent Borehole Radar Systems and Methods", filed Apr. 18, 2011, 8 pgs.
U.S. Final Office Action, dated Apr. 1, 2014, U.S. Appl. No. 13/131,872, "Fracture Characterization Using Directional Electromagnetic Resistivity Measurements," filed May 30, 2011, 14 pgs.
U.S. Final Office Action, dated May 7, 2014, U.S. Appl. No. 13/128,676, "A High Frequency Dielectric Measurement Tool", filed May 11, 2011, 22.
U.S. Final Office Action, dated Jul. 10, 2013, U.S. Appl. No. 13/128,676, "A High Frequency Dielectric Measurement Tool", filed May 11, 2011, 23 pgs.
U.S. Non Final Office Action, dated Apr. 3, 2015, U.S. Appl. No. 13/061,759, "A 3D Borehole Imager," filed Nov. 23, 2009, 25 pgs.
U.S. Non-Final Office Action, dated Sep. 24, 2013, U.S. Appl. No. 13/061,759, "A 3D Borehole Imager ", filed Nov. 23, 2009, 12 pgs.
U.S. Non-Final Office Action, dated Mar. 13, 2013, U.S. Appl. No. 13/061,759, "A 3D Borehole Imager", filed Nov. 23, 2009, 17 pgs.
U.S. Non-Final Office Action, dated Sep. 23, 2014, U.S. Appl. No. 13/131,872, "Fracture Characterization Using Directional Electromagnetic Resistivity Measurements," filed May 30, 2011, 17 pgs.
U.S. Non-Final Office Action, dated Jul. 14, 2014, Appl No. 13/131,872, "Fracture Characterization Using Directional Electromagnetic Resistivity Measurements," filed Aug. 20, 2009, 18 pgs.
U.S. Non-Final Office Action, dated Nov. 20, 2013, U.S. Appl. No. 13/131,872, "Fracture Characterization Using Directional Electromagnetic Resistivity Measurements," filed May 20, 2011, 22 pgs.
Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, Nov. 11, 2007, p. 1-9.
Bittar, Michael S. et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, Oct. 6, 1991, pp. 1-8.
Bittar, Michael S. et al., "Invasion Profiling with a Multiple Depth of Investigation, Electromagnetic Wave Resistivity Sensor", SPE 28425, 69th Annual Technical Conference and Exhibition of the SPE, New Orleans, LA, Sep. 25, 1994, pp. 1-12, plus 11 pgs of Figures.
Bittar, Michael S. et al., "The Effects of Rock Anisotropy on MWD Electromagnetic Wave Resistivity Sensors", SPWLA 35th Annual Logging Symposium, Jun. 19, 1994, 18 pgs.
Bonner, S. et al., "A New Generation of Electrode Resistivity Measurements for Formation Evaluation While Drilling", SPWLA 35th Annual Logging Symposium, Jun. 19, 1994, pp. 1-19.
Callaghan, G. , "HFSS Modeling of Cross-Coupling in Borehole Radar", The Institution of Electrical Engineers, printed and published by IEEE, 2002, pp. 217-221, Savoy Place, London WC2R 0BL, UK.
Cheung, P. et al., "Field Test Results of a New Oil-Based Mud Formation Imager Tool", SPWLA 42nd Annual Logging Symposium, Jun. 17, 2001, pp. 1-14.
Clark, Brian et al., "A Dual Depth Resistivity Measurement for Fewd", SPWLA 29th Annual Logging Symposium, Jun. 1988, 25 pgs.
Clark, Brian et al., "Electromagnetic Propagation Logging While Drilling: Theory and Experiment", SPE Formation Evaluation, Sep. 1990, pp. 263-271.
Daniels, David J. , "Surface-Penetrating Radar", Electronics & Communication Engineering Journal, Aug. 1996, pp. 165-182.
Hagiwara, T. , "A New Method to Determine Horizontal-Resistivity in Anisotropic Formations Without Prior Knowledge of Relative Dip", 37th Annual SPWLA Logging Symposium, New Orleans, LA, Jun. 16, 1996, pp. 1-5 , plus 3 pgs of Figs.
Liu, Sixin et al., "Application of Borehole Radar for Subsurface Physical Measurement", Nanjing Institute of Geophysical Prospecting and Institute of Physics Publishing, J. Geophys. Eng. 1 (2004), pp. 221-227.
Liu, Sixin et al., "Electromagnetic Logging Technique Based on Borehole Radar", IEEE Transactions on Geoscience and Remote Sensing, vol. 40, No. 9, Sep. 2002, pp. 2083-2092.
Lofts, J. et al., "A New Micor-Resistivity Imaging Device for Use in Oil-Based Mud", SPWLA 43rd Annual Logging Symposium, Jun. 2, 2002, pp. 1-14.
Luling, Martin G. et al., "Processing and Modeling 2-MHz Resistivity Tools in Dipping, Laminated, Anisotropic Formations: SPWLA", SPWLA 35th Annual Logging Symposium, Paper QQ, Jun. 19-22, 1994, 1994, pp. 1-25.
Mack, S. G. et al., "MWD Tool Accurately Measures Four Resistivities", Oil & Gas Journal, May 25, 1992, pp. 1-5.
Mechetin, V. F. et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, Date Unkn, 17 pgs.
Meyer, W. H. , "New Two Frequency Propagation Resistivity Tools", SPWLA 36th Annual Logging Symposium, Jun. 26-29, 1995, 12 pgs.
Rodney, Paul F. et al., "Electromagnetic Wave Resistivity MWD Tool", SPE Drilling Engineering, Oct. 1986, p. 337-346.
Van Dongen, Koen W. et al., "A Directional Borehole Radar System", Subsurface Sensing Technologies and Applications, vol. 3, No. 4, Oct. 2002, Delft University of Technology, Delft, The Netherlands, pp. 327-346.
Zhu, Tianfei et al., "Two Dimensional Velocity Inversion and Synthetic Seismogram Computation", Geophysics, vol. 52, No. 1, Jan. 1987, pp. 37-49.
U.S. Non-Final Office Action, dated Oct. 4, 2016, U.S. Appl. No. 13/131,872, "Fracture Characterization Using Directional Electromagnetic Resistivity Measurements," filed May 30, 2011, 19 pgs.

* cited by examiner

FIG. 6
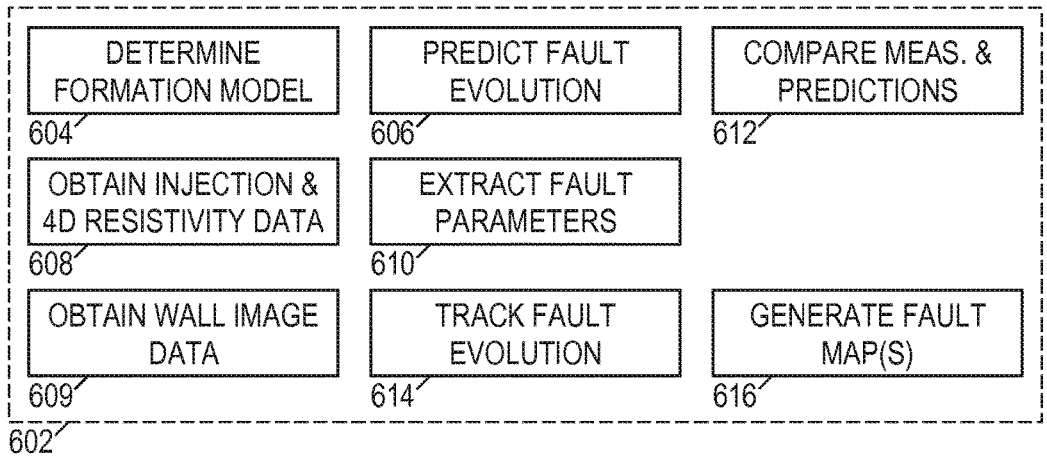
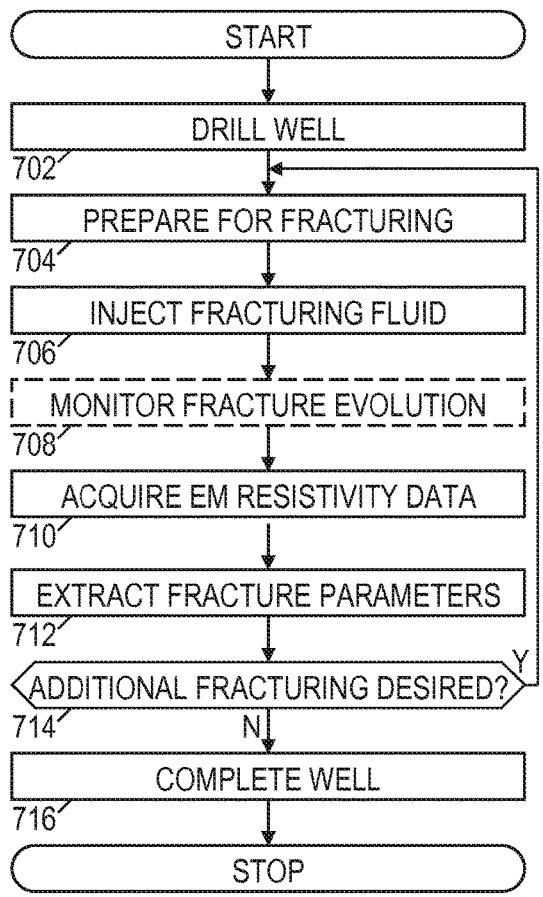
FIG. 7

FRACTURE CHARACTERIZATION USING DIRECTIONAL ELECTROMAGNETIC RESISTIVITY MEASUREMENTS

CROSS-REFERENCE TO RELATED APPLICATIONS

The present application is a continuation of U.S. patent application Ser. No. 13/131,872, filed on May 30, 2011, which in turn claims priority to PCT Pat. App. No. PCT/US2009/054470, filed on Aug. 20, 2009. The foregoing applications are hereby incorporated herein in their entirety.

BACKGROUND

As drillers create wells to extract fluids from subterranean formations, they often perform a "fracturing" operation in which a fluid is injected into the well bore under high pressure to enlarge any existing fractures in the formation and to create new fractures. The injected fluid often carries entrained particulate matter to be deposited in the fractures, thereby propping them open when the pressure returns to normal. Such fractures substantially increase the permeability of the formation—making it easier for fluid to flow from the formation into the well bore (and vice versa). Fracturing operations are also often employed in injection wells, i.e., wells created to inject fluids into subterranean formations for disposal, storage, or reservoir flooding.

In any case, it is often desirable to confine the effects of the fracturing operation to a bounded region. For example, any fractures that would promote fluid flow between formations are generally undesirable, as such flows can contaminate water tables, relieve reservoir pressures, divert fluids into inaccessible regions, or create other problems. Accordingly, oilfield operators employ models to predict the effects of a fracturing operation and, in some cases, employ microseismic detection to monitor fracture evolution during the fracturing operation itself. The seismic sensors are typically positioned in one or more monitoring wells spaced apart from the fracturing well, but in at least one proposed method the seismic sensors are positioned in a concrete annulus around the bore of the injecting well. See, e.g., U.S. Pat. No. 5,503,252 to Withers, titled "System and Method for Monitoring the Location of Fractures in Earth Formations". Such seismic monitoring methods often perform inadequately in regions having high seismic attenuation or significant seismic interference.

BRIEF DESCRIPTION OF THE DRAWINGS

A better understanding of the various disclosed embodiments can be obtained when the detailed description is considered in conjunction with the accompanying drawings, in which:

FIG. 6 shows an illustrative software architecture;

FIG. 7 shows an illustrative fracture characterization method; and

Figure 1:
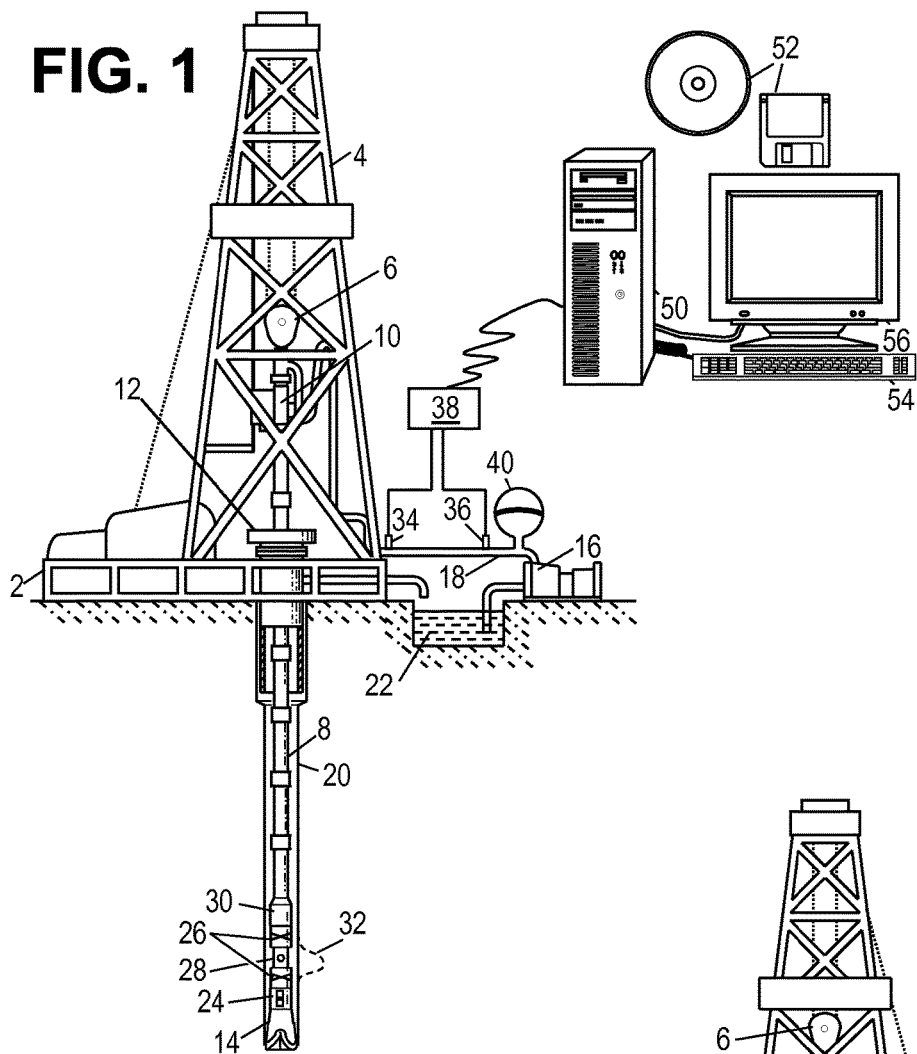
FIG. 1 shows an illustrative fracturing while drilling environment.

While the invention is susceptible to various modifications and alternative forms, specific embodiments thereof are shown by way of example in the drawings and will herein be described in detail. It should be understood, however, that the drawings and detailed description thereto are not intended to limit the claims to the particular forms described herein, but on the contrary, the intention is to cover all modifications, equivalents and alternatives falling within the spirit and scope of the patented claims.

DETAILED DESCRIPTION

The problems identified in the background are at least partly addressed by a borehole assembly that provides fracture characterization and monitoring of fracture progression. In some method embodiments, a fracturing fluid with a contrasting resistivity is employed to make the formation fractures detectable by a directional electromagnetic logging tool in the borehole. A directional electromagnetic logging tool collects three-dimensional measurements of a volume surrounding an open borehole. Such measurements can be collected during or after a fracturing operation. In some cases these 3D measurements will be augmented by borehole wall image measurements that complement the deep directional resistivity measurements. In any case, the measurements are analyzed to determine parameters characterizing fractures in the formation and to report these parameters to a user. Illustrative parameters include fracture direction, height, extent, length, and thickness. The resistivity measurements can be augmented using a borehole wall image logging tool.

Also disclosed are certain tool assemblies. Some disclosed logging assemblies include an electromagnetic resistivity tool, a borehole wall imaging tool, and a processor. The electromagnetic resistivity tool acquires resistivity measurements as a function of position, orientation, and radial distance. The borehole wall image logging tool acquires borehole wall measurements as a function of position and orientation. The processor combines said resistivity and borehole wall measurements to detect fractures and create a log of at least one fracture parameter, which can be displayed to a user.

Some disclosed fracturing assemblies include: a fluid injection port, a directional electromagnetic logging tool, and a processor. The fluid injection port supplies a fluid into a borehole to fracture a formation. The directional electromagnetic logging tool is positioned to obtain three-dimensional measurements of the formation being fractured. The processor determines fracturing progress from said measurements and communicates said progress to an operator.

Turning now to the figures, FIG. 1 shows an illustrative fracturing while drilling environment. A platform 2 supports a derrick 4 having a traveling block 6 that raises and lowers a drill string 8 in a borehole 20. A top drive 10 rotates the drill string 8 as the string is lowered through the wellhead, thereby driving a drill bit 14 to create and extend the borehole 20. A pump 16 circulates fluid through a feed pipe 18 to the drill string 8. The fluid flows down through the interior of the string 8 to the bit 14, passes through one or more orifices to remove drill cuttings from the hole bottom, and move upward along the annulus around the string 8 to carry the cuttings from the hole 20 into a pit 22.

The bit 14 is part of a bottom hole assembly, or "BHA", that includes drill collars to add weight and rigidity to the end of the drill string 8. The thick walls of the drill collars make them a convenient location for downhole tools and instrumentation. The bottomhole assembly of FIG. 1 includes a borehole wall imager 24, a directional electromagnetic logging tool 26, a stimulation tool 28, and a telemetry tool 30. The telemetry tool 30 includes a BHA control module and a position/orientation sensing module. Other downhole tools can be included in the BHA, as well as normal (non-instrumented) drill collars.

The borehole wall imager 24 measures one or more properties of the borehole wall as a function of tool position and orientation, thereby enabling the BHA to log an image of the borehole wall. Many suitable imaging technologies exist. In certain embodiments, the borehole wall imager employs acoustic transducers that rotate with the drill string to measure the acoustic impedance, acoustic reflectance, or the density of the formation at its interface with the borehole. In other embodiments, the borehole wall imager employs micro-resistivity measurements of the borehole wall. In yet other embodiments, gamma-ray or neutron attenuation measurements are collected. Each of these technologies provides the ability to identify locations where faults and voids intersect the borehole, and they can enable analysis of rock textures to determine formation composition and stress directions—information which can be instrumental for determining where and how to initiate a fracturing process. Illustrative examples of potentially suitable tools are disclosed in U.S. Pat. No. 4,829,488 ("Drive Mechanism for Borehole Televiewer"), U.S. Pat. No. 5,899,958 ("Logging while drilling borehole imaging . . . "), U.S. Pat. No. 6,191,588 ("Methods and Apparatus for Imaging Earth Formation . . . "), and U.S. Pat. No. 6,359,438 ("Multi-depth focused resistivity imaging tool . . . ".

The directional electromagnetic logging tool 26 collects measurements indicative of the formation resistivity, permittivity, or other related properties (e.g., attenuation, phase shift, velocity) as a function of depth, azimuth, and radial distance from the borehole. Some tool designs employ tilted coil antennas that rotate with the drill string to make azimuthally sensitive measurements, and radial sensitivity can be achieved with multiple transmit-receive antenna spacings and/or multiple signal frequencies. Other tool designs employ antenna triads that can be "virtually" steered independently of the physical tool. Yet other designs employ downhole radar transducers for transmitting pulses and measuring reflections.

Each of these technologies offers the ability to identify regions having contrasting resistivities in the formation around the borehole. Illustrative examples of potentially suitable tools are disclosed in U.S. Pat. No. 5,757,191 ("Virtual Induction Sonde for Steering Transmitted and Received Signals"), U.S. Pat. No. 6,181,138 ("Directional Resistivity Measurements for Azimuthal Proximity Detection . . . "), U.S. Pat. No. 6,476,609 ("Electromagnetic Wave Resistivity Tool Having a Tilted Antenna . . . "), and applications U.S. Provisional Application No. 61/117,433, PCT Application No. PCT/US2009/065537 and U.S. Non-Provisional Application Ser. No. 13/061,759 ("A 3D Borehole Imager"). Each of these and other BHA tools can be powered by downhole batteries and/or downhole power generators such as a turbine in the fluid flow stream.

The stimulation tool 28 includes one or more ports for injecting a fracturing fluid into a formation. In some embodiments, such as those disclosed in U.S. Pat. App. Pub. 2005/0230107 ("Methods of Well Stimulation During Drilling Operations"), the ports are designed to jet high pressure flow streams directly against the borehole wall. In other embodiments, the stimulation tool restricts fluid flow along the borehole away from the ports, enabling the driller to create a region of high pressure against the borehole wall. Flow restrictors or packers can be deployed for this purpose. The intended result of the tool's operation is the formation and enlargement of fractures 32 in the formation proximate the stimulation tool. Further discussion of fracturing while drilling operations can be found in U.S. Pat. App. Pub. 2005/0230107, titled "Methods of Well Stimulation During Drilling Operations" by inventors Billy McDaniel and Jim Surjaatmadja.

We note that in FIG. 1, the antennas of the directional electromagnetic logging tool 26 are positioned above and below the region of the borehole exposed to the maximum pressure from the ports of the stimulation tool 28. This tool configuration is chosen to maximize the sensitivity of tool 26 to the evolution of fractures 32 during the fracturing process. Nevertheless, at least some directional electromagnetic logging tool configurations can sense beyond the end of the tool, so this configuration is not considered essential.

Telemetry tool 30 collects the measurements of the other BHA tools and stores or transmits representative data. The data can be processed downhole and/or sent to the surface to have the processing performed there. At the surface, a data acquisition module 38 collects the telemetry data and conveys it to a data processing system 50. In the system of FIG. 1, telemetry tool 30 communicates with the surface using mud pulse telemetry, an established technology that generates pressure waves that propagate in the fluid flowing through drill string 8. Data acquisition module 38 detects these waves using sensors 34, 36. A pulsation dampener 40 can be employed to reduce noise interference caused by the pump 16. Alternative telemetry technologies exist and can be used, including electromagnetic telemetry, wired drill pipe telemetry, and acoustic telemetry along the wall of the drill string. The various telemetry technologies also permit commands and configuration information to be communicated to the bottomhole assembly from the surface, thereby enabling a driller to interact with the bottomhole assembly and, among other things, steer the borehole along a desired path in response to data collected by the BHA.

Data processing system 50 includes internal data storage and memory having software (represented by removable information storage media 52), along with one or more processor cores that execute the software. The software configures the system to interact with a user via one or more input/output devices (such as keyboard 54 and display 56). Among other things, system 50 processes data received from acquisition module 38 and generates a representative display for the driller to perceive. During a fracturing operation, the system can display data indicative of measured fracture parameters and show how they compare to a desired target, thereby enabling an operator to tailor fluid flow parameters to optimize the result. In addition to acquiring data during the fracturing operation, the BHA can be raised and lowered to perform logging runs through the region of interest before and after the fracturing operation.

Figure 2:
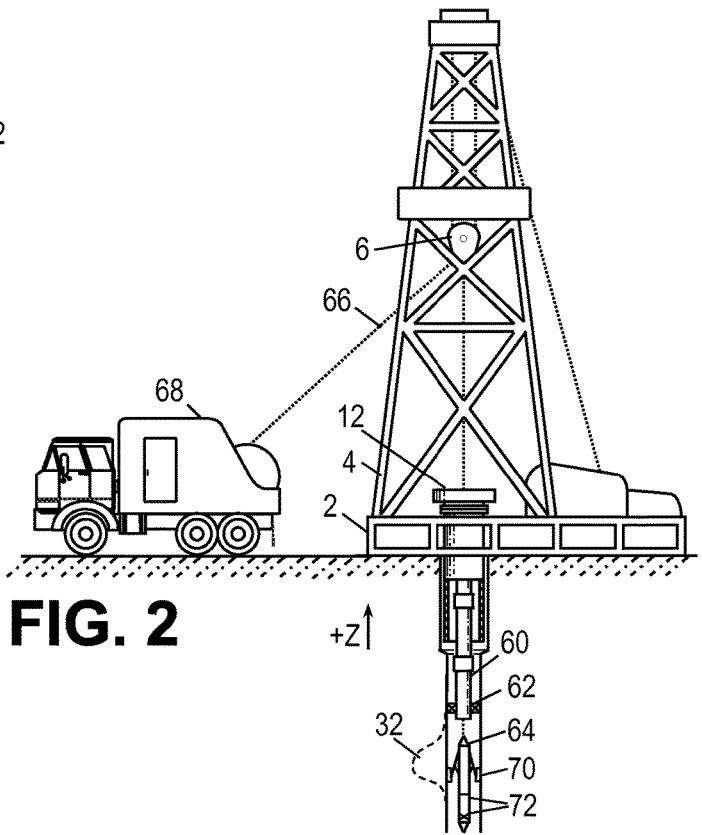
FIG. 2 shows a second illustrative fracturing environment.

FIG. 2 shows a second illustrative fracturing environment. Unlike the fracturing while drilling environment of FIG. 1, FIG. 2 shows that the BHA has been pulled from the borehole. A tubing string 60 is set in the borehole with one or more packers 62 to confine the fracturing pressure to the desired region of the borehole. A tool assembly 64 is suspended by a wireline 66 from a logging truck 68. In addition to physical support, the wireline provides a bundle of electrical conductors (and optionally optical fibers) to provide power from the surface and convey telemetry from the tool assembly to the processing systems at the surface.

The illustrated tool assembly includes an array of borehole wall imaging pads 70 and a directional electromagnetic logging tool 72.

The tool assembly can be conveyed on logging trips through the open borehole before and after a fracturing operation to collect three-dimensional measurements of the formation's electromagnetic properties, as well as images of the borehole walls. Moreover, the tool assembly can be anchored (or optionally tripped on logging runs) during the fracturing operation to monitor the evolution of the fractures. Processing systems in the logging truck enable operators to observe representative characteristics of the detected fractures.

Figure 3:
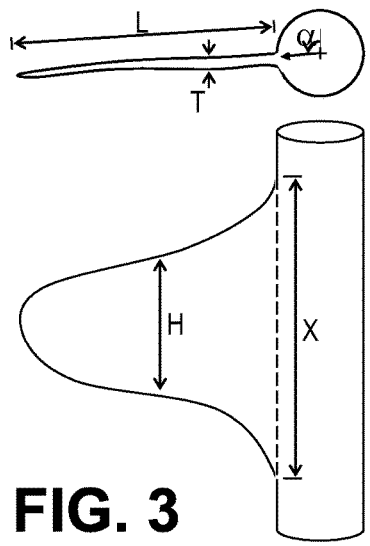
FIG. 3 shows some illustrative fracture characteristics.

FIG. 3 shows some illustrative fracture characteristics that can be determined by the processing systems based on measurements by the directional electromagnetic tool and optionally the borehole wall imaging tool. In the overhead view of the borehole, FIG. 3 shows a fracture of length L, average thickness T, and azimuthal angle α intersecting the borehole. (As used herein, the azimuthal angle of a fracture represents the fracture's orientation in the horizontal plane rather than its position relative to the borehole.) In the side view, it can be seen that the fracture has an average height H and it intersects the borehole along an extent X. Such parameters are illustrative of fracture characteristics that would be of interest to analysts. However, they do not represent an exhaustive set of parameters nor do they represent a necessary set of parameters. For example, some analysts may be more interested in fracture volume, while others may simply need the limits of a "bounding box" that encloses all the detected fractures.

Figure 4:
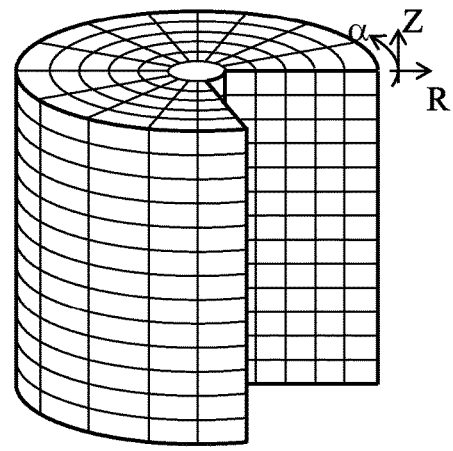
FIG. 4 shows an illustrative 3D volume.

FIG. 4 shows an illustrative 3D volume representing the data that can be collected by the directional electromagnetic logging tool. The tool makes formation measurements as a function of depth (or position along the borehole axis) Z, azimuth angle α, and radial distance R. This coordinate system is divided into a grid of cells or "voxels", and the tool determines one or more formation property measurements for each cell.

In at least some embodiments, the tool provides resistivity measurements for 32 or more depths at 256 or more azimuthal angles, with a depth resolution of 2 centimeters or better. In high resistivity formations, an operator can use a low resistivity fracturing fluid such as a saline mud. The directional electromagnetic logging tool can detect regions of such contrast material, thereby enabling a processing system to identify fractures and determine their characteristic parameters. Similarly, in low resistivity formations, an operator can use a high resistivity fracturing fluid such as an oil-based mud. If a region is repeatedly scanned during a fracturing operation, the processing system can track the evolution of fractures.

Figure 5:
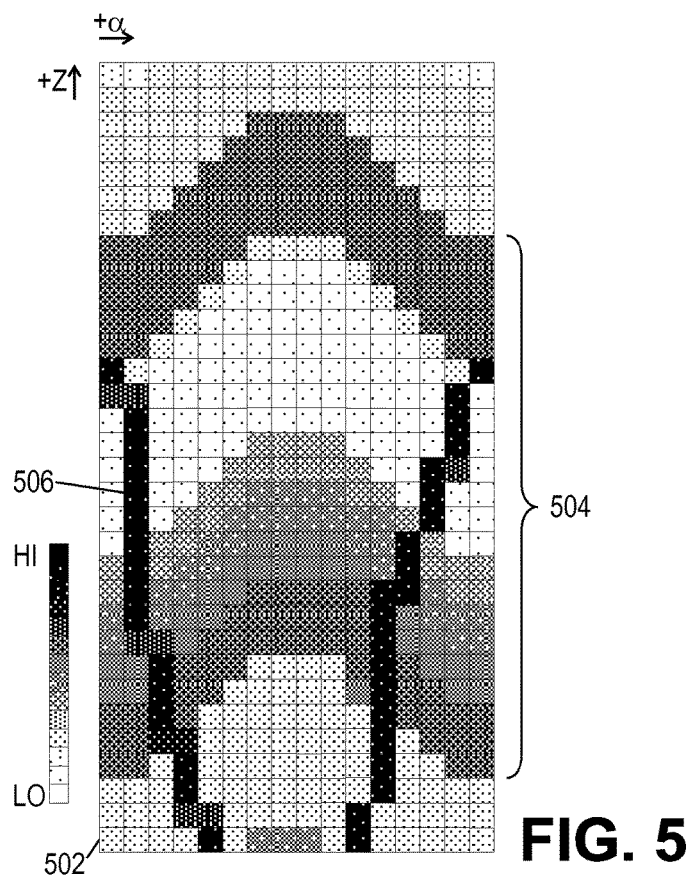
FIG. 5 shows an illustrative borehole wall image.

FIG. 5 shows an illustrative borehole wall image 502. An imaging tool scans the borehole wall and makes formation property measurements as a function of depth Z and azimuthal angle. As with the 3D volume, this 2D map is divided into cells or "pixels", and the tool determines one or more formation property measurements for each cell. The measurement value can be shown as a color or intensity value in the map, thereby creating an image of the borehole wall. Acoustic measurements and micro-resistivity measurements offer the opportunity for very high resolution images, with 512 or more azimuthal angles and a depth resolution of 0.5 cm or better. Such images make bedding structures 504 and faults 506 clearly visible. The processing system 50 can combine such measurements to obtain a better determination of the fracture parameters.

FIG. 6 shows functional block diagrams for an illustrative software package 602 suitable for running on data processing system 50, optionally in cooperation with other computer systems on a computer network.

In block 604, the software determines a model of the formation. This model can be based on seismic survey data, augmented by well logs. The model generally includes estimates of formation bed geometry, formation composition, density, and stress. In block 606, the software predicts the behavior of the formation when the formation is subjected to a fracturing process. The software can rely on rock mechanic models and empirical models from previous fracturing studies when simulating the evolution of faults in response to specified fracturing fluid pressures and flow rates. Once an operator has tried various simulations and arrived at desirable results, the fracturing operation can begin.

In block 608, the software configures the processing system to obtain injection data, i.e., data regarding characteristics of the fracturing fluid (including resistivity), the borehole geometry, the fluid flow rate, the fluid pressure, and the cumulative fluid volume. The software further configures the processing system to collect 4D resistivity data, i.e., a time progression of 3D resistivity data. In block 609, the software optionally obtains a log of the borehole wall image.

In block 610, the software processes the resistivity data and optionally combines it with wall image data to extract fault parameters. Illustrative parameters include fracture azimuth, fracture complexity, fracture coverage (e.g., the percentage of the borehole that is within a specified distance of at least one fracture), fracture height, and fracture half-length. (A fracturing operation generally forms many fractures. The lengths of these fractures have an exponential distribution that is characterized in terms of the half-length, i.e., the length greater than the lengths of half of the fractures and less than the lengths of the other half.)

The extracted fault parameters can be compared to the model predictions in block 612 to test the model validity and/or determine if the goals of the fracturing process have been achieved. This comparison can also be used as the basis for refining the model or adjusting the injection parameters to optimize the fracturing process. In the current embodiment, such refinements and adjustments are in the purview of the user, but in certain contemplated embodiments the software includes a module for automatically controlling the injection parameters in response to the fault parameter measurements. Illustrative adjustments include reducing the flow rate as fracture parameters approach the target state.

In block 614 the history of extracted fault parameters is recorded to track the evolution of faults during the fracturing process. A mapping module 616 generates fault maps based on the information tracked in blocks 610 and 614, enabling the user to visually monitor the progression of the fracturing process.

FIG. 7 shows an illustrative fracture characterization method. Beginning in block 702, the operator drills a well. In block 704, the operator prepares for a fracturing operation. Such preparation may include logging the borehole, preparing a model, determining a fracturing plan based on simulation, and securing fracturing fluids and equipment. Also included is positioning the fluid injection ports at the desired fracturing position and, if necessary, isolating the fracturing region from the rest of the borehole. In some configurations the operator might also position a directional electromagnetic logging tool in the vicinity of the fracturing region.

In block 706, the operator pumps the fracturing fluid through the injection port. As mentioned previously, the fluid possesses an electrical resistivity that contrasts with the resistivity of the formation. The operator optionally collects directional electromagnetic logging measurements during the fracturing process in block 708. Such measurements enable real-time tracking of fracture evolution so that the operator can tailor the injection parameters to optimize results.

Once the fluid injection is complete (or at least temporarily halted), the operator collects directional electromagnetic resistivity measurements in block 710, optionally augmented with a borehole image log. In block 712, the data processing system extracts fracture parameters from these measurements. The operator analyzes the fracture parameters in block 714 and determines whether additional fracturing is desired. If so, the method loops back to block 704. Otherwise the operator completes the well in block 716, typically by cementing a casing in place and perforating it in those locations where it is desired to produce or inject fluids.

Figure 8:
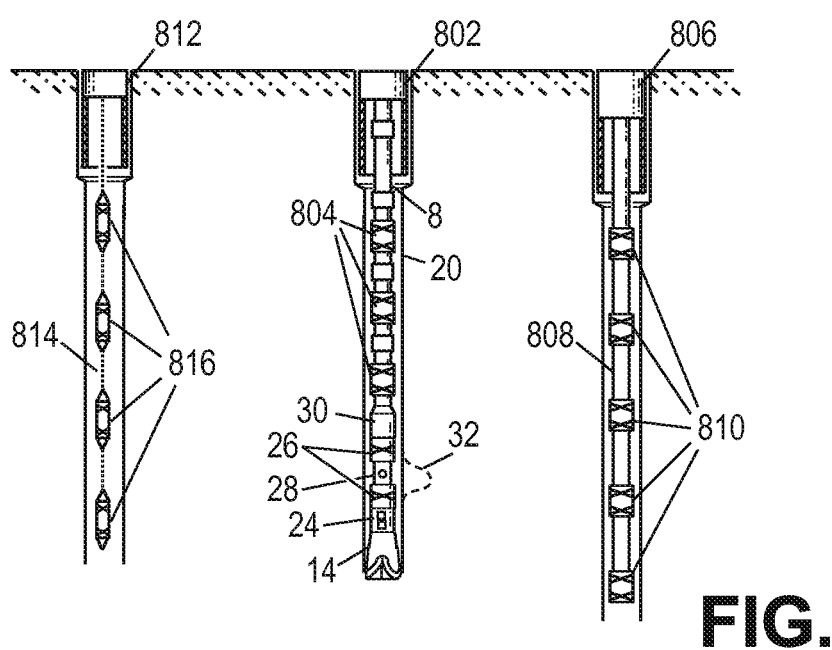
FIG. 8 shows an illustrative extended fracture monitoring array.

The region in which directional electromagnetic logging tool measurements can be performed can be extended in either or both of at least two ways illustrated in FIG. 8. FIG. 8 shows a well 802 being drilled and fractured using a drill string 8. The drill string 8 includes multiple directional electromagnetic logging tools 804 to extend the measurement region along the axis of the well. The measurement region can be extended away from the well 802 using one or more offset wells 806, 812, each having one or more directional electromagnetic logging tools. Offset well 806 has an array of directional electromagnetic logging tools 810 on a continuous tubing string 808 (e.g., coil tubing or composite tubing). Offset well 812 has an array of directional electromagnetic logging tools 816 on a wireline 814. Fractures that extend into the measurement regions of these additional tools 804, 810, 816, can be tracked in real time. If the leading edge of the fracture is within the range of multiple tools, the measurements can be combined to triangulate and track the fractures with greater accuracy.

Numerous variations and modifications will become apparent to those skilled in the art once the above disclosure is fully appreciated. For example, the directional electromagnetic logging tool can be located outside the borehole, e.g., in a second borehole near the borehole being fractured, to monitor fracture formation from a distance. In another embodiment, the directional electromagnetic logging measurements are used in conjunction with a micro-seismic monitoring tool to complement and verify the operation of each. It is intended that the following claims be interpreted to embrace all such variations and modifications.

What is claimed is:

1. A fracturing characterization method comprising: positioning an electromagnetic resistivity tool in a borehole proximate to a formation; obtaining a borehole wall image log; obtaining three-dimensional (3D) formation resistivity measurements collected, as a function of different depths, azimuths, and radial distances from the borehole, by the tool; combining information from the borehole wall image log with the 3D resistivity measurements to determine at least one fracture parameter; and halting fracturing of the formation, by reducing the flow rate of fracturing fluid by a processor, when the at least one fracture parameter satisfies a set of criteria.

2. The method of claim 1, wherein the set of criteria includes a minimum length and a maximum extent.

3. The method of claim 1, wherein data for the borehole wall image log is acquired by an acoustic tool or a micro-resistivity tool.

4. The method of claim 1, further comprising creating a log comprising the at least one fracture parameter.

5. The method of claim 1, wherein the at least one fracture parameter comprises fracture direction.

6. The method of claim 1, wherein the at least one fracture parameter comprises fracture height.

7. The method of claim 1, wherein the at least one fracture parameter comprises fracture extent.

8. The method of claim 1, wherein the at least one fracture parameter comprises fracture length.

9. The method of claim 1, wherein the at least one fracture parameter comprises fracture thickness.

10. A logging assembly comprising: a borehole wall image logging tool comprising an array of borehole wall imaging pads to obtain borehole wall measurements as a function of position and orientation; an electromagnetic resistivity tool coupled to the borehole wall image logging tool, the electromagnetic resistivity tool comprising at least one tilted antenna to obtain three-dimensional (3D) resistivity measurements as a function of different depths, azimuths, and radial distances from the borehole; and a processor communicably coupled to the borehole wall image logging tool and the electromagnetic resistivity tool, the processor having software that, when executed, combines the 3D resistivity measurements and the borehole wall measurements to determine at least one fracture parameter and causes reduction of a flow rate of fracturing fluid when the at least one fracture parameter satisfies a set of criteria.

11. The logging assembly of claim 10, wherein the set of criteria includes a minimum length and a maximum extent.

12. The logging assembly of claim 10, wherein the borehole wall image logging tool an acoustic tool or a micro-resistivity tool.

13. The logging assembly of claim 10, wherein the software, when executed, creates a log comprising the at least one fracture parameter.

14. The logging assembly of claim 10, wherein the processor is conveyed downhole with the logging assembly.

15. The logging assembly of claim 10, wherein the processor is disposed within a data processing system at the Earth's surface.

16. The logging assembly of claim 10, wherein the at least one fracture parameter comprises fracture extent.

17. The logging assembly of claim 10, wherein the at least one fracture parameter comprises fracture direction.

18. The logging assembly of claim 10, wherein the at least one fracture parameter comprises fracture height.

* * * * *

UNITED STATES PATENT AND TRADEMARK OFFICE
CERTIFICATE OF CORRECTION

Page 1 of 1

PATENT NO.        : 9,909,414 B2
APPLICATION NO.   : 14/709314
DATED             : March 6, 2018
INVENTOR(S)       : Michael S. Bittar and Clive D. Menezes It is certified that error appears in the above-identified patent and that said Letters Patent is hereby corrected as shown below:

In the Specification

In Column 3, Line 53, insert --co-pending-- before "applications"

Signed and Sealed this
Twenty-ninth Day of May, 2018

Andrei Iancu
*Director of the United States Patent and Trademark Office*